US007258790B2

(12) United States Patent
Brune et al.

(10) Patent No.: US 7,258,790 B2
(45) Date of Patent: Aug. 21, 2007

(54) CONTROLLED EUTROPHICATION SYSTEM AND PROCESS

(75) Inventors: David E. Brune, Seneca, SC (US); John A. Collier, Seneca, SC (US); Thomas E. Schwedler, Clemson, SC (US); A. G. Eversole, Clemson, SC (US)

(73) Assignee: Clemson University, Clemson, SC (US)

( * ) Notice: Subject to any disclaimer, the term of this patent is extended or adjusted under 35 U.S.C. 154(b) by 169 days.

(21) Appl. No.: 10/929,331

(22) Filed: Aug. 30, 2004

(65) Prior Publication Data

US 2005/0115893 A1 Jun. 2, 2005

Related U.S. Application Data

(60) Provisional application No. 60/504,104, filed on Sep. 19, 2003.

(51) Int. Cl.
 *C02F 3/32* (2006.01)
(52) U.S. Cl. ............... 210/602; 210/603; 210/610; 210/612; 210/259; 210/903; 210/906
(58) Field of Classification Search ............ 210/602, 210/603, 612, 631, 252, 259, 198.1, 610, 210/903, 906; 71/10, 21, 23, 24
 See application file for complete search history.

(56) References Cited

U.S. PATENT DOCUMENTS

| 3,763,824 | A | | 10/1973 | Schoon |
| 3,955,318 | A | * | 5/1976 | Hulls ............... 47/1.4 |
| 4,137,868 | A | | 2/1979 | Pryor |
| RE30,038 | E | * | 6/1979 | Sweeney ............ 119/212 |
| 4,284,508 | A | | 8/1981 | Jewell |
| 4,316,961 | A | | 2/1982 | Klass et al. |
| 4,329,428 | A | | 5/1982 | Ghosh et al. |
| 4,424,064 | A | * | 1/1984 | Klass et al. ............ 48/197 A |
| 5,040,486 | A | * | 8/1991 | Pack ............... 119/215 |
| 5,143,623 | A | * | 9/1992 | Kroll ............... 210/705 |
| 5,176,100 | A | | 1/1993 | Fujino |
| 5,205,237 | A | | 4/1993 | Skeggs et al. |

(Continued)

OTHER PUBLICATIONS

Search Report and Written Opinion for PCT/US04/28152, Dec. 8, 2004.

(Continued)

*Primary Examiner*—Fred G. Prince
(74) *Attorney, Agent, or Firm*—Dority & Manning, P.A.

(57) ABSTRACT

A controlled eutrophication system and process are disclosed. The system includes the combination of a partitioned aquaculture system in conjunction with an anaerobic digester. Wastewater containing pollutants, such as nitrogen and phosphorus, are fed to the partitioned aquaculture system. Algae within the system converts the pollutants into algal biomass. Fish populations, in turn, control the algal populations. The fish populations may then be periodically harvested for human or animal consumption. A polishing chamber is contained in the system in which aquatic organisms remove substantial amounts of the algae from batch fed additions of water. The water is then discharged to an external water source containing virtually no pollutants. In one embodiment, the biomass excreted by the aquatic organisms in the system are collected and fed to a digester. In the digester, the biomass is converted to a hydrocarbon gas and collected for its fuel value, while the liquid fraction is collected for its fertilizer value.

61 Claims, 5 Drawing Sheets

U.S. PATENT DOCUMENTS

| | | | | |
|---|---|---|---|---|
| 5,264,349 | A | * | 11/1993 | De Baere ................... 435/29 |
| 5,353,745 | A | | 10/1994 | Fahs, II |
| 5,501,718 | A | | 3/1996 | Bandurski |
| 5,778,823 | A | | 7/1998 | Adey et al. |
| 5,820,759 | A | | 10/1998 | Stewart et al. |
| 5,993,649 | A | * | 11/1999 | DeBusk et al. ............... 210/97 |
| 6,192,833 | B1 | | 2/2001 | Brune et al. |
| 6,200,475 | B1 | * | 3/2001 | Chen .......................... 210/613 |
| 6,299,774 | B1 | | 10/2001 | Ainsworth et al. |
| 6,315,904 | B1 | * | 11/2001 | Rose et al. ................. 210/602 |

OTHER PUBLICATIONS

Brune, et al., "Integrated Production of Biofuel, Biofertilizer, and High Value Aquatic Biomass in a Controlled Eutrophication Process," The Tenth Biennial Bioenergy Conference, Boise, ID, Sep. 22-26, 2002.

* cited by examiner

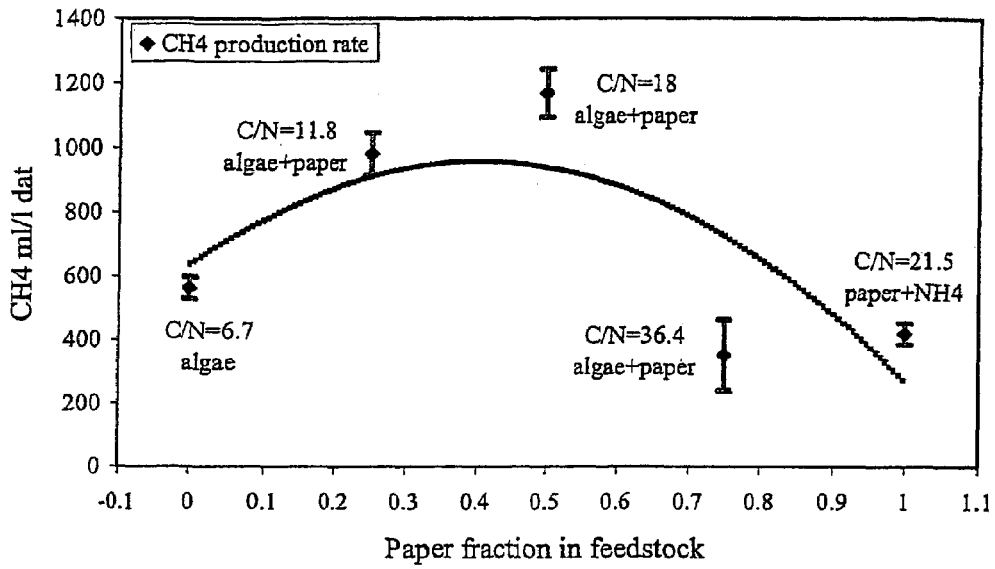
FIG. 5: Co-digestion of algal sludge and waste paper at 4 g VS/l day loading rate, 10 days HRT & 35 °C
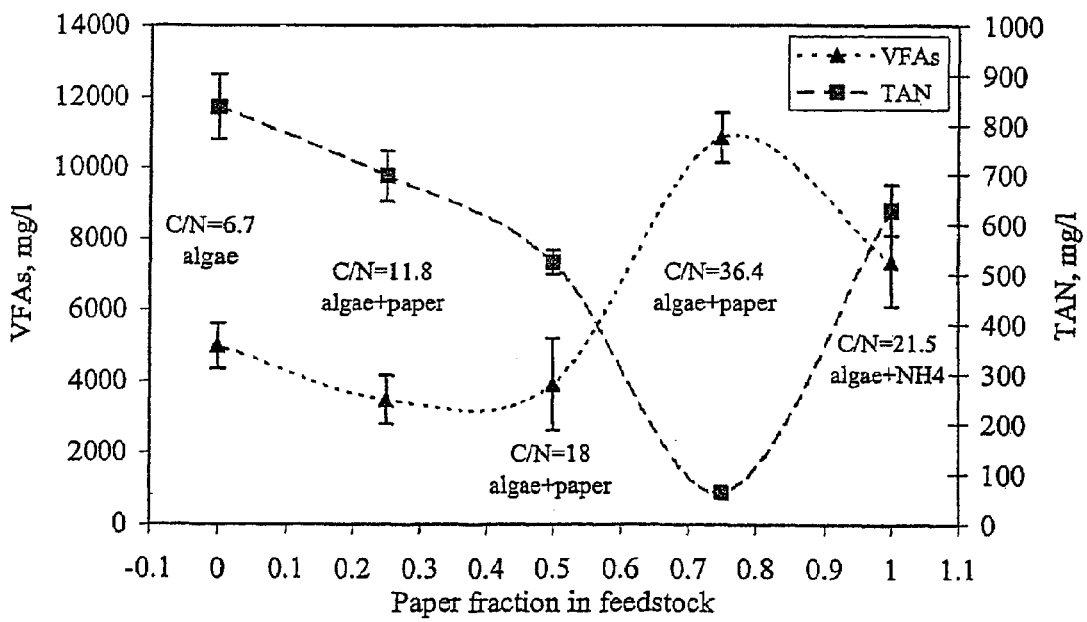
FIG. 6: The VFAs & TAN at each loading

CONTROLLED EUTROPHICATION SYSTEM AND PROCESS

RELATED APPLICATIONS

The present application is based on and claims priority to a U.S. Provisional Application filed on Sep. 19, 2003 and having U.S. Ser. No. 60/504,104.

BACKGROUND OF THE INVENTION

Although fertilizers are necessary in order to maximize crop production, fertilizers may cause runoff water pollution problems. In addition to crop runoff areas, concentrated animal feeding operations may also cause water quality issues in adjacent runoff areas.

In fact, the United States Environmental Protection Agency has indicated that at least 35% of assessed rivers, lakes and estuaries are impaired by one or more pollutants. One of the primary pollutants found are nutrients, such as nitrogen and phosphorus.

In this regard, efforts are currently underway to establish total maximum daily load values for pollutants, such as the above-described nutrients to impaired water bodies. For example, one of the current action proposals calls for the development of a unified national strategy to minimize water quality impacts from agricultural watersheds.

In response, those skilled in the art are attempting to develop cost effective pollution control solutions. Many proposed plans, however, call for the chemical treatment of wastewaters. Chemically treating wastewaters, however, cannot only be expensive but can also lead to the production of byproducts that must be disposed of.

As such, a need currently exists for a system and process for removing pollutants from wastewater. More particularly, a need exists for a system and process for removing nutrients, such as nitrogen and phosphorus, from runoff waters prior to discharging the water into a public water source. A need also exists for a system and process for removing pollutants from a wastewater that does not require the expenditure of large amounts of energy.

SUMMARY OF THE INVENTION

In U.S. Pat. No. 6,192,833 to Brune, et al., which is incorporated herein by reference, a partitioned aquaculture system is disclosed. The aquaculture system relates to a process and system for raising aquatic organisms, such as shellfish, shrimp and fish. One of the basic concepts disclosed in U.S. Pat. No. 6,192,833 is to partition conventional pond fish culture into distinct physical/chemical/biological processes linked together by a water velocity field. For instance, fish culture ponds are separated from algal production that allows separate optimization of the growth of the above species. Thus, the above system allows for increased algal productivities, increased fish output per unit production area, a reduction in feed inputs and a reduction in aeration power consumption in comparison to many conventional aquaculture systems.

The present invention is directed to the use of a partitioned aquaculture system for removing pollutants and other contaminants from a wastewater or runoff water stream. Specifically, the system and process of the present invention is well suited to receiving a polluted water source, removing pollutants, such as nitrogen and phosphorus, and then discharging clean water into an external water source, such as a public water system. In addition to removing pollutants, the system and the process of the present invention can also simultaneously grow a fish population for harvesting algal biomass and can generate a useful biomass byproduct. The biomass may be fed to a digester, for instance, and converted into a hydrocarbon gas and a liquid fertilizer composition. The system and process of the present invention operates almost entirely on solar power with minimal energy consumption.

For instance, in one embodiment, the present invention is directed to a controlled eutrophication process. The process includes the steps of flowing a wastewater containing a waste component comprising nitrogen, phosphorus or mixtures thereof into an algal growth channel. The wastewater is contacted with a species of algae in the algal growth channel. The algae consumes and depletes the waste component from the wastewater.

At least a portion of algal laden water from the algal growth channel is then fed to a polishing chamber. The polishing chamber contains an aquatic organism that consumes the algae contained in the water and, in turn, excretes a concentrated algal biomass.

Once a desired amount of the algae is removed from the water, the water is then discharged from the polishing chamber to an external water source.

In one embodiment, in addition to the polishing chamber, the system of the present invention can also include one or more raceways. The raceways can contain a second aquatic organism that also consumes algae. Water from the algal growth channel may flow continuously through the raceways for further control of algae levels in the system. The second aquatic organism contained in the raceways may be periodically harvested for human consumption, animal consumption or for any other purpose. The aquatic organism contained in the raceways may be, for instance, a shellfish such as shrimp, bivalves, or a fish. For example, a fish that may be contained in the raceways include tilapia, blackfish, or other filter feeding fish.

Although algal laden water may flow through the raceways continuously, the algal laden water, in one embodiment, is fed to the polishing chamber in a batchwise manner for insuring that algae populations are reduced below a desired level. For instance, the process of the present invention can eliminate at least 60% of the algae contained in the water, and in one embodiment, can eliminate greater than about 90% of the algae contained in the water.

In one particular embodiment, the polishing chamber can include multiple containment sections, such as a first containment section and a second containment section. Each of the containment sections can contain an aquatic organism. Water may be alternately discharged from the first containment section and the second containment section such that the polishing chamber operates as a sequencing batch reactor. Water discharged from the polishing chamber may contain less than about 5 mg per liter of organic matter and less than about 0.05 mg per liter of phosphorus.

In one embodiment, the process of the present invention can further include the step of collecting the algal biomass from the raceway and/or the polishing chamber that is excreted by the aquatic organisms. The algal biomass can be collected continuously or periodically. In one particular embodiment, for instance, a porous conveyor may be located at the bottom of the polishing chamber and/or raceways for continuously removing the biomass.

Once collected, the biomass, in one embodiment, may be fed to an anaerobic digester and heated. In the digester, the biomass may undergo fermentation causing the production of a hydrocarbon gas, such as methane. The methane may be collected and used as desired as an energy source. In addition to producing a hydrocarbon gas, the bioreactor may also produce a liquid fertilizer composition containing concentrated amounts of nitrogen and phosphorus sources.

In one embodiment, the algal biomass is combined with a cellulose source and fed to the digester. The cellulose source may be, for instance, waste-paper, agricultural residues, or municipal solid waste. The paper may be combined with the biomass in an amount from about 20% to about 80% by weight, such as from about 40% to about 60% by weight of the mixture. Once placed in the digester, the mixture may be heated to a temperature of 30° C. to about 40° C.

Other features and aspects of the present invention are discussed in greater detail below.

BRIEF DESCRIPTION OF THE DRAWINGS

The specification now sets forth a full and enabling disclosure, including an illustration of the best mode for practicing the appended claims, and makes reference to the drawings, in which:

FIGS. 5 and 6 are graphical representations of the results obtained in the Example below.

Figure 1:
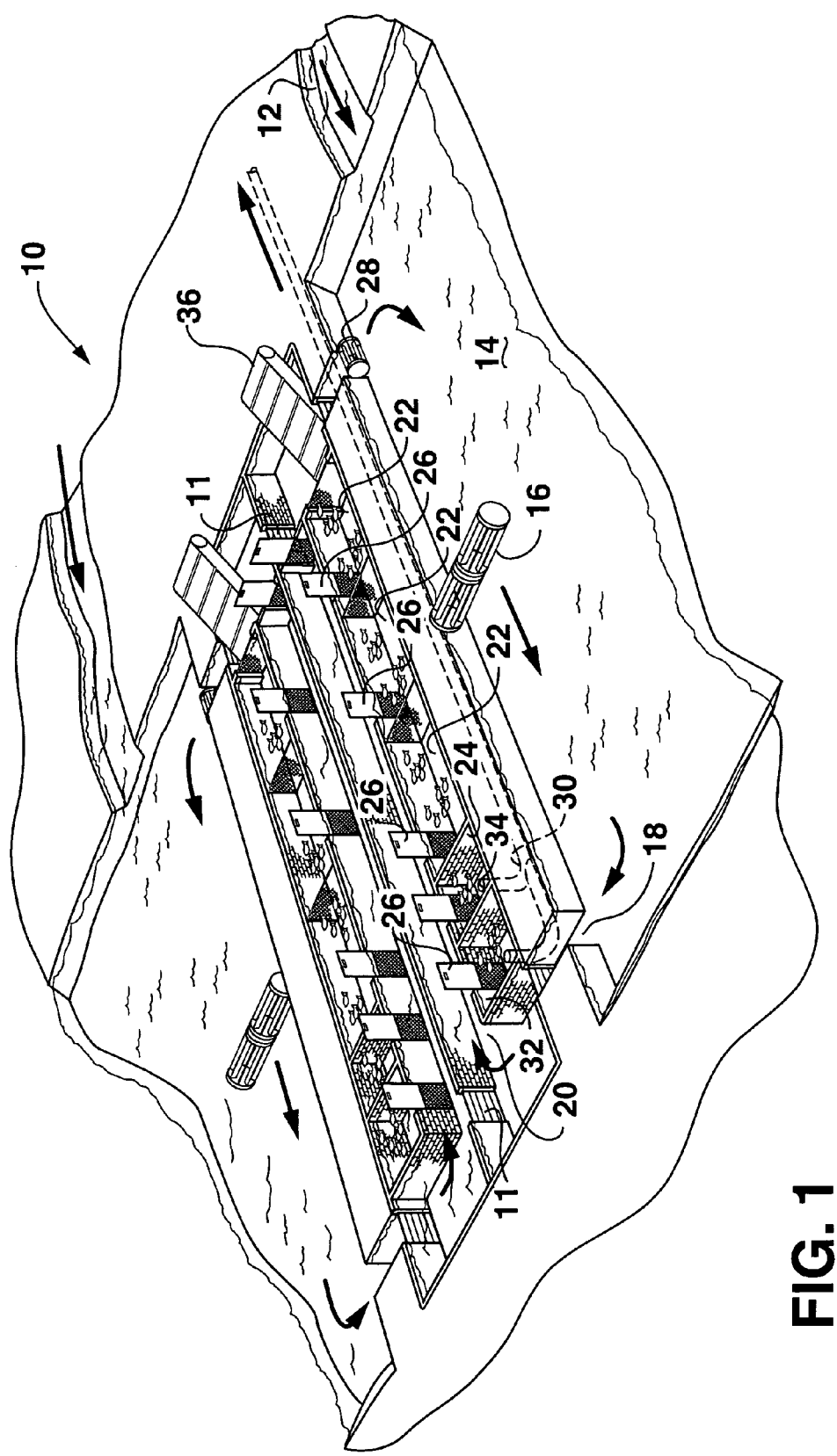
FIG. 1 is an isometric view of an exemplary partitioned aquaculture system for use in a controlled eutrophication system.

Repeated use of reference characters throughout the present specification and appended drawings is intended to represent the same or analogous features or elements.

DETAILED DESCRIPTION

Reference will now be made in detail to presently preferred embodiments of the disclosed technology, examples of which are fully represented in the accompanying drawings. Such examples are provided by way of an explanation, not limitation. In fact, it will be apparent to those skilled in the art that various modifications and variations can be made without departing from the spirit and scope of the present subject matter. For instance, features illustrated or described as part of one embodiment can be used on another embodiment to yield a still further embodiment. Still further variations in selection of components and/or characteristics may be practiced, to satisfy particular desired user criteria. Thus, it is intended that the presently disclosed technology covers such modifications and variations as come within the scope of the present features and their equivalents.

In general, the present invention is directed to a system and process for removing pollutants and other contaminants from a wastewater or runoff water stream. The system and the process are well suited, for instance, for receiving a polluted water source, removing pollutants, such as nitrogen and phosphorus, and then discharging clean water into an external water source, such as a public water system. These goals are accomplished using a controlled eutrophication process and system. For example, in one embodiment, the controlled eutrophication system and process captures and converts waste nitrogen and phosphorus from irrigation drainage and agricultural surface waters into algal biomass to be digested anaerobically for energy production and simultaneously used for coculture of high value aquatic biomass.

The controlled eutrophication process and system of the present invention includes the combination of a partitioned aquaculture system and a digester for converting biomass into useable fuels. The partitioned aquaculture system includes three main components: algal growth channels, fish raceways, and a settling sump, to capture and concentrate settleable solids, such as fish waste and algal flocs, for removal from the system. The fish raceways are separated from the algal growth channels with, for instance, coarse screens, allowing free flow of water while restraining the fish. In the system, the removal of excess algal solids can be managed with populations of filter-feeding fish. The partitioned aquaculture system and process allows for semi-independent control and management of algal production ponds, while the finfish and filter-feeding raceways optimize the environmental conditions for each component and maximize the waste treatment and algal feed production potential. This in turn reduces feed inputs and power requirements for aeration, and maximizes waste treatment capacity. Finally, the separation of the different process functions, and maximization of algal biomass production, results in, not only increasing fish production, but also in providing the potential for waste carbon dioxide utilization, and for harvesting conversion of algal biomass for production of a renewable power.

In one embodiment, the partitioned aquaculture system for effluent treatment and reuse has a primary fish zone in which high-value fish species, such as catfish, striped bass, or tilapia may be cultured. In some applications, a detritivore fish species can be placed downstream from the primary fish zone to consume uneaten food, fecal matter, and particulate waste. Downstream from this area, in this embodiment, a treatment zone may be located in which flow rate control devices are used to convert waste nutrients from the primary fish species into algal biomass. After the treatment zone, a secondary fish zone houses a filter-feeding fish species (algavore) that consumes a considerable portion of the plantonic or settled algal cells and converts them to fish biomass. The remaining algal biomass may be settled out of the water column through bioflocculation (spontaneous settling), aided as needed by small amounts of inorganic or metal salt flocculants. Water exiting the treatment zone is sufficiently treated to allow for discharge to surface waters or for a complete and continuous reuse in the culture of sensitive fish species that require very low levels of nitrogen and phosphorus for their survival.

The biomass excreted by the fish in the system is collected and fed to a digester for producing a useable fuel source. In one embodiment, for instance, an anaerobic digester is used to convert the fish excreted biomass into a hydrocarbon gas, such as methane. The present inventors have discovered that much greater amounts of a hydrocarbon gas are produced when combining excreted biomass in the digester with cellulose opposed to feeding algal biomass directly into the digester. In one embodiment, a cellulose source, such as paper, is fed to the digester in combination with the biomass.

The partitioned aquaculture system of the present invention results in a substantial reduction in atmospheric emissions, water pollutants, and other environmental impacts associated with external feed inputs. Energy inputs into the system are reduced in comparison to conventional systems, as a result of the reduction in the aeration requirements, due to the separation of the algal and fish production processes, and the increased oxygen production in the algal channels.

Figure 2:
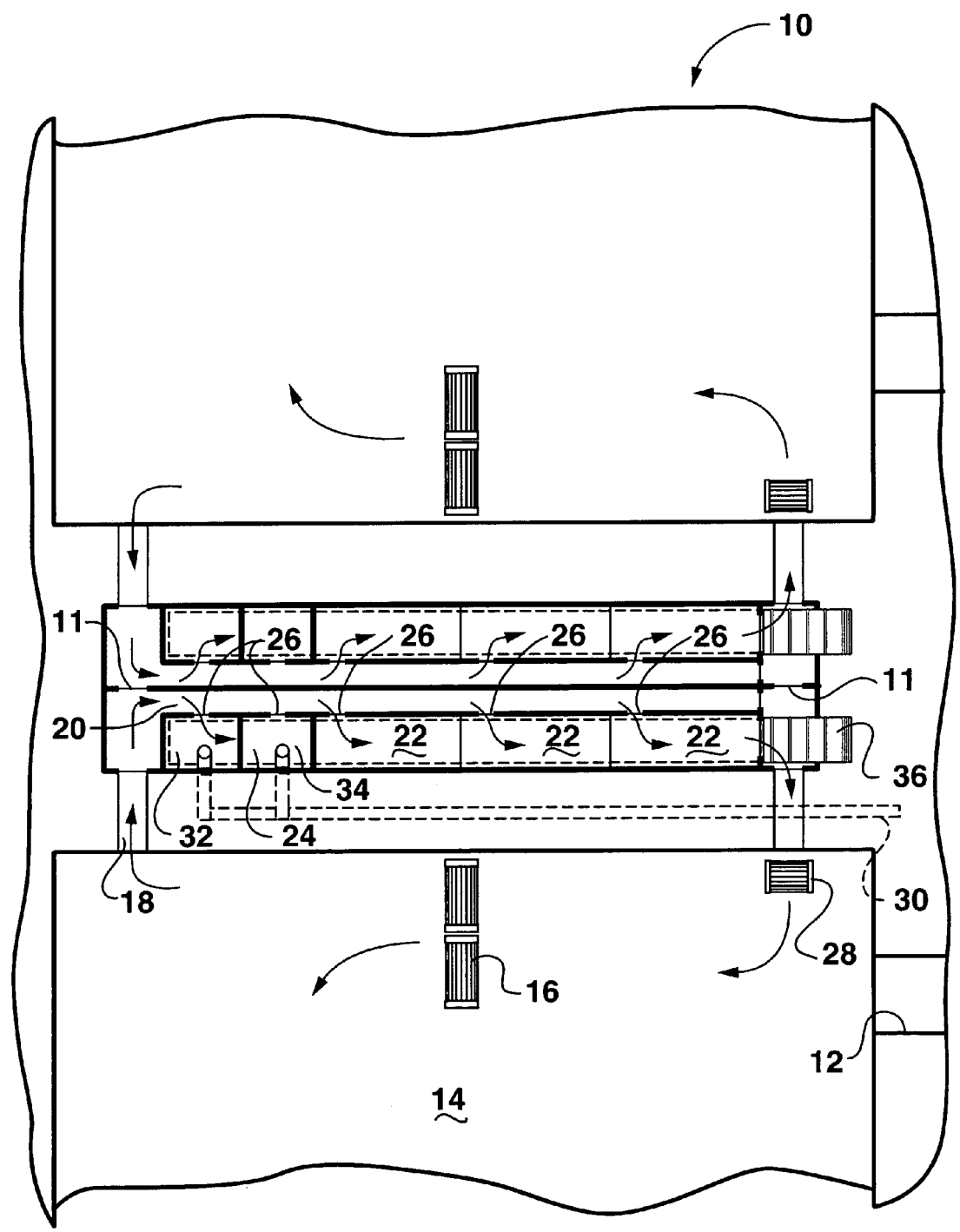
FIG. 2 is a detailed view from above of the system shown in FIG. 1.

Referring to FIGS. 1 and 2, one exemplary embodiment of a partitioned aquaculture system made in accordance with the present invention is illustrated.

FIGS. 1 and 2 depict an example of a system that cleans wastewater of at least one waste component such as dissolved nutrients through a controlled eutrophication process using the partitioned aquaculture system generally 10. Generally, the system as illustrated is constructed using earthen dikes and walls of concrete construction. The particular structural materials used may vary according to the locale and installation of the particular system, for example, similar results may be obtained using an interconnected system of open tanks.

As shown in FIGS. 1 and 2, the partitioned aquaculture system 10 includes two identical aquaculture subsystems separated by a gate or weir 11. The gate 11 can be made from, for instance, a plurality of removable slats. The slats may be removed for interconnecting the two subsystems. For example, in one embodiment, the gate 11 may be disassembled in order to drain one of the subsystems into the adjoining aquaculture subsystem.

The following description will focus on one of the aquaculture subsystems shown in the figures. It should be understood, however, that the adjoining subsystem operates in a similar fashion.

As shown, a wastewater, such as agricultural surface runoff, enters through wastewater ingress point 12 into an algal growth channel 14. Although only one wastewater ingress channel 12 is depicted for the algal growth channel 14, it will be appreciated that the number and location of points for wastewater input may be varied, as well as the number of growth channels.

In algal growth channel 14, the wastewater comes into contact with species of algae that consume and deplete the waste component. For example, the algae may consume waste components that include nitrogen and/or phosphorus and produce oxygen. One such type of algae is blue-green algae. Algal growth channel 14 also features a homogenous water velocity field, depicted by the arrows. In this regard, the algal growth channel 14 is placed in communication with a flow rate control device 16. The flow rate control device 16 may be, for example, a low speed, low head, feedback-controlled paddlewheel. Feedback control may be provided by a microprocessor or other controller. Paddlewheel mixed algal growth channels, such as 14, provide enhanced gas exchange and minimize waste solids settling while maximizing algal productivity.

The algal biomass contained within growth channel 14 represents a stored oxygen demand, resulting in a net positive dissolved oxygen production. However, if the algae cells remain in the pond, a steady state population develops, and algal respiration or decay will consume the oxygen being produced. Therefore, net oxygen can be produced by photosynthesis only if the algae cells are harvested from the growth channel periodically. In this regard, the algal growth channel 14 is placed in fluid communication with a plurality of containment cells that contain an organism, such as fish, which consumes mature algae received from the algal growth channel 14.

More particularly, the algal growth channel 14 is placed in fluid communication with a common channel 20 via a connector 18, shown here as a culvert. The common channel 20 is in fluid communication with a plurality of raceways 22 and at least one polishing chamber 24. The raceways 22 and the polishing chamber 24 are in fluid communication with the common channel 20 via a plurality of moveable doors 26. The raceways 22 and the polishing chamber 24 are for maintaining an aquatic organism that feeds upon algae. In this regard, each moveable door 26 is also placed in communication with a screen. The screens allow fluid flow into the raceways and the polishing chamber when the doors are open without permitting the aquatic organisms from escaping from their contained areas.

As water enters the algal growth channel 14, the algae consume any waste components contained in the water, such as nitrogen and phosphorus. The algal laden and oxygen rich water produced in the algal growth channel 14 is then fed to the raceways 22 and the polishing chamber 24 via the common channel 20. As shown, the polishing chamber 24 is segregated from the raceways 22. The raceways 22, however, in this embodiment, are interconnected by a plurality of screens. Once fed to the raceways 22 and the polishing chamber 24, an aquatic organism, such as fish, consumes the algae for removing the algae from the water.

As shown, the system 10 further includes a second flow rate control device 28 which may be, for instance, a paddlewheel. Flow rate control device 28 is positioned for controlling the velocity of water within the common channel 20 and the raceways 22.

Of particular advantage, flow rate control device 28 works independently of flow rate control device 16 for independently controlling the flow rate of water within the raceways 22 in comparison to the flow rate of water within the algal growth channel 14. In this manner, adjustments can be made within the raceways without significantly affecting the conditions in algal growth channel 14 and vice versa. In this manner, optimum conditions can be maintained for the aquatic organisms being produced and for the algae being grown.

In one embodiment, flow rate control device 16, flow rate control device 28, and doors 26 may be operated by a controller, such as a microprocessor, for automating the system. The microprocessor may be used, for instance, for adjusting the flow rate control devices and the doors based upon process conditions or according to a preset cycle. In one embodiment, for instance, the system 10 can include numerous sensors for sensing oxygen concentration, the pH of the water, ammonia concentration, and/or temperature at one or more locations. For instance, the sensors can be contained in the system or samples from the system can be fed to a centralized location and tested.

The controller can be in communication with each of the sensors for automatically monitoring system conditions. Based on information received from the sensors, the controller can then automatically adjust flow rates as desired.

For instance, if it is determined that dissolved oxygen concentrations are too low, the controller can increase flow rates within the algal growth channel 14 and the raceways 22 by adjusting flow rate control devices 16 and 28. By increasing the flow rate within the algal growth channel 14, more oxygen will be introduced into the water. Also, by increasing flow rates through the raceways, more oxygen will be fed to the aquatic organisms.

If, on the other hand, it is determined by the sensors that there is too much dissolved oxygen within the water, the controller can then decrease flow rates within the algal growth channel 14 and within the raceways 22. In this manner, less oxygen will remain in the water and the aquatic organisms being grown will receive lesser amounts of oxygen.

In one embodiment, the flow rates within the algal growth channel 14 and the raceways 22 may also be adjusted depending upon the time of day. For example, the flow rate of the water within the algal growth channel 14 and the raceways 22 may be increased during the day and decreased during night.

In general, the flow rate within the algal growth channel 14 and the raceways 22 may vary dramatically depending upon the size of the system and the aquatic organisms present. In one particular embodiment, for instance, the flow rates may vary from about 0.1 feet per second to about 0.3 feet per second.

The raceways 22, as described above, house an aquatic organism that consumes the algae in the water. In general, any suitable aquatic organism may be contained within the raceways 22. The aquatic organism may be, for instance, a fish, a bivalve such as clams and mussels, or a shellfish such as shrimp. Suitable fish species that may be present in the raceways include tilapia, blackfish, and the like. Such organisms are typically referred to as planktivorous.

The purpose of the raceways 22 is to maintain algae populations within controlled limits in order to maximize process conditions. In this regard, the doors 26 can be opened and closed depending upon algae levels within the water. Further, the amount of aquatic organisms maintained within the raceways may also vary.

Of particular advantage, the aquatic organisms may be periodically harvested as a useful byproduct of the system. For example, the aquatic organisms may be harvested and sold for human consumption or animal consumption.

As opposed to the raceways 22, the polishing chamber 24 is configured to remove an algal population from a certain volume of water and then to discharge the water into an effluent 30. The effluent 30 may carry the water, for instance, to an external water source.

For instance, in one embodiment, the polishing chamber 24 may operate much like a batch reactor. In particular, in order to discharge a quantity of clean water, a door 26 to the polishing chamber 24 is opened. Water then flows into the polishing chamber and the door 26 is closed. An aquatic organism, such as a fish population, is maintained in the polishing chamber that consumes most of the algae contained within the water. Once the algae levels are below a desired setpoint, the water is then discharged through the effluent 30 (which may be maintained at a desired height). The discharged water thus has reduced levels of pollutants, such as nitrogen and phosphorus and may be substantially algae free.

The aquatic organisms that are maintained in the polishing chamber 24 may be the same or different from the aquatic organisms contained with the raceways 22. The aquatic organisms contained within the polishing chamber 24, however, are subjected to much different conditions than the aquatic organisms contained in the raceways. For instance, the aquatic organisms contained in the polishing chamber must be capable of consuming a large portion of the algae contained in a batch of the algal laden water. Specifically, when the door 26 to the polishing chamber 24 is opened and the polishing chamber is filled with the algal laden water, the aquatic organisms first experience a high concentration of algae. As time goes by, however, algae levels begin to significantly drop as the algae is being consumed. The organism contained within the polishing chamber must be well adapted for feeding on algae contained in concentrated amounts and in less concentrated amounts.

In one embodiment, for instance, a greater concentration of aquatic organisms may be contained within the polishing chamber in comparison to the raceways. Further, the size of the aquatic organism may vary depending upon whether the organism is being contained in the polishing chamber or one of the raceways. In one particular embodiment, tilapia has been found to be well suited for use in the polishing chamber 24.

Ideally, the amount of clean water being discharged from the polishing chamber 24 is substantially equivalent to the amount of wastewater being received within the algal growth channel 14 through the inlet 12. In order to reduce algae levels within the water sufficiently for the water to be discharged, however, the polishing chamber operates in a batch-like manner. In order to increase throughput in the polishing chamber, the polishing chamber may be operated as a sequencing batch reactor.

For instance, as shown in FIGS. 1 and 2, the polishing chamber 24, in this embodiment, includes a first containment section 32 and a second containment section 34. Each of the containment sections 32 and 34 are separated from the common channel 20 by doors 26. Although the embodiment shown in FIGS. 1 and 2 includes two containment sections, it should be understood that the polishing chamber may contain many more containment sections as desired.

By having multiple containment sections, the polishing chamber 24 is capable of discharging water through one of the containment sections, such as containment section 32, while algal populations are being reduced to another batch of water in containment section 34. As shown in FIGS. 1 and 2, containments sections 32 and 34 are both connected to the effluent 30. Thus, by having multiple containment sections, the system is capable of continuously discharging clean water to the effluent 30 in order to match the amount of wastewater being fed to the system.

By having the algae being consumed in the containment sections of the polishing chamber 24, substantially clean water is discharged from the system. The aquatic organisms contained in the polishing chamber, for instance, may be selected such that the water being discharged from the polishing chamber contains less than about 5 milligrams per liter of organic matter and less than about 10 milligrams per liter of volatile solids. The aquatic organisms contained in the polishing chamber may, for instance, reduce algae levels by at least 60%, such as by at least 90%. In one particular embodiment, for instance, algae levels can be reduced by greater than 95%, such as greater than about 98%.

Through the process of the present invention, most of any phosphorus or nitrogen contained in the wastewater may be removed. For example, the system of the present invention is capable of removing 95% of any phosphorus or nitrogen contained in the wastewater that is received. For instance, the discharged water may have phosphorus and/or nitrogen at a concentration of less than about 0.05 milligrams per liter.

As algae is consumed by the aquatic organisms contained in the raceways 22 and the polishing chamber 24, the aquatic organisms excrete an algal biomass that accumulates in the system. Of particular advantage, the present inventors have discovered that the biomass can be collected and fed to a digester for producing a useful fuel, such as a hydrocarbon gas.

In order to collect the biomass, for instance, as shown in FIGS. 1 and 2, the system may include a porous conveyor 36 that extends below and into each of the raceways and polishing chamber. The biomass settles on the conveyor 36 and can thus be removed from the system and collected.

Figure 3:
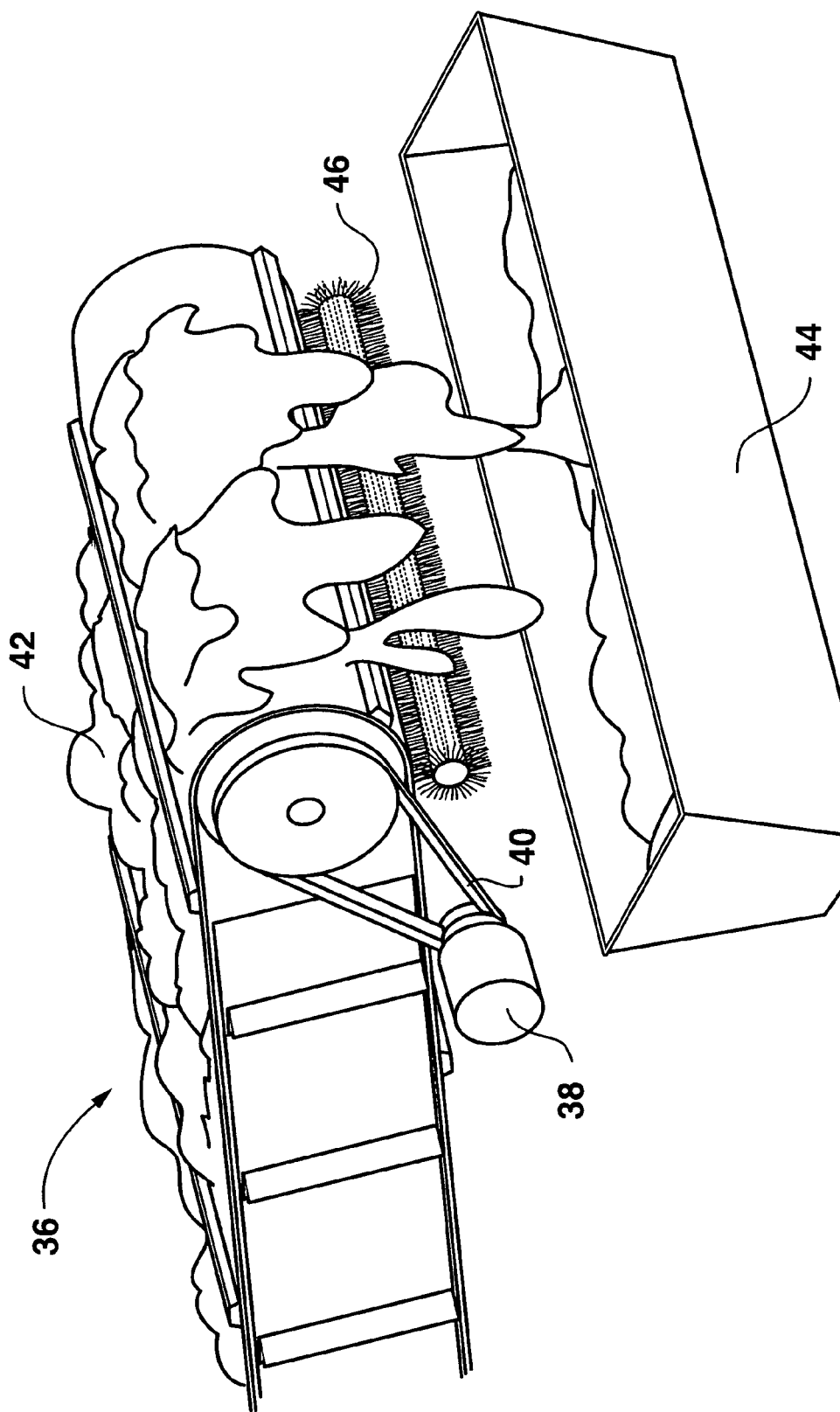
FIG. 3 is an exploded view of an exemplary biomass extraction member and collection unit.

Proceeding to FIG. 3, an exemplary biomass extraction member or conveyor 36 is presented in closer detail. Porous conveyor 36 is driven by a motor 38 via a belt 40. Algal biomass 42 is carried by the biomass extraction member 36 from either or both the raceway and polishing chamber and deposited in a biomass collector 44, shown here as an open trough. Biomass removal may be expedited through use of an additional element such as brush 46 to unseat biomass adhered to the belt.

In one embodiment, the porous conveyor 36 may comprise a fabric, such as a polyethylene weave belt running the length of the raceway/polishing chamber, angled upward toward the collection device 44. For instance, the fabric conveyor 36 may slant upwards at an angle of from about 3° to about 20°, such as from about 8° to about 15°.

Although the use of a conveyor 36 as shown in FIGS. 1 and 2 may be preferred in some applications, it should be understood that any suitable device or mechanism for removing biomass sludge from the system may be used in the present invention. For instance, in other embodiments, the algal biomass 42 may be pumped from the system. In still another embodiment, the biomass may settle to the bottom of the system and then dredged when desired.

In one embodiment, in order to promote settling of the algal biomass, the water contained in the raceways and the polishing chamber may be treated with a flocculating agent. For instance, in one embodiment, a metal salt, such as an iron salt may be used to enhance flocculation. Particular iron salts that may be used include iron chloride ($FeCl_3$) or iron sulfate ($FeSO_4$). The use of a flocculating agent, however, is entirely optional and may not be needed in particular applications.

Once the algal biomass is collected, in one embodiment, the biomass may be fed to a digester for producing a fuel, such as a hydrocarbon gas. The digester may contain, for instance, microorganisms that anaerobically convert the biomass into the hydrocarbon gas. The hydrocarbon gas can be collected and used as a fuel source.

In one embodiment, the present inventors have discovered that the efficiency and performance of the digester may be improved in accordance with the present invention by combining a cellulose source with the biomass material. The cellulose source may be, for instance, rice straw, wood, sawdust, almond hulls, paper, and the like.

Figure 4:
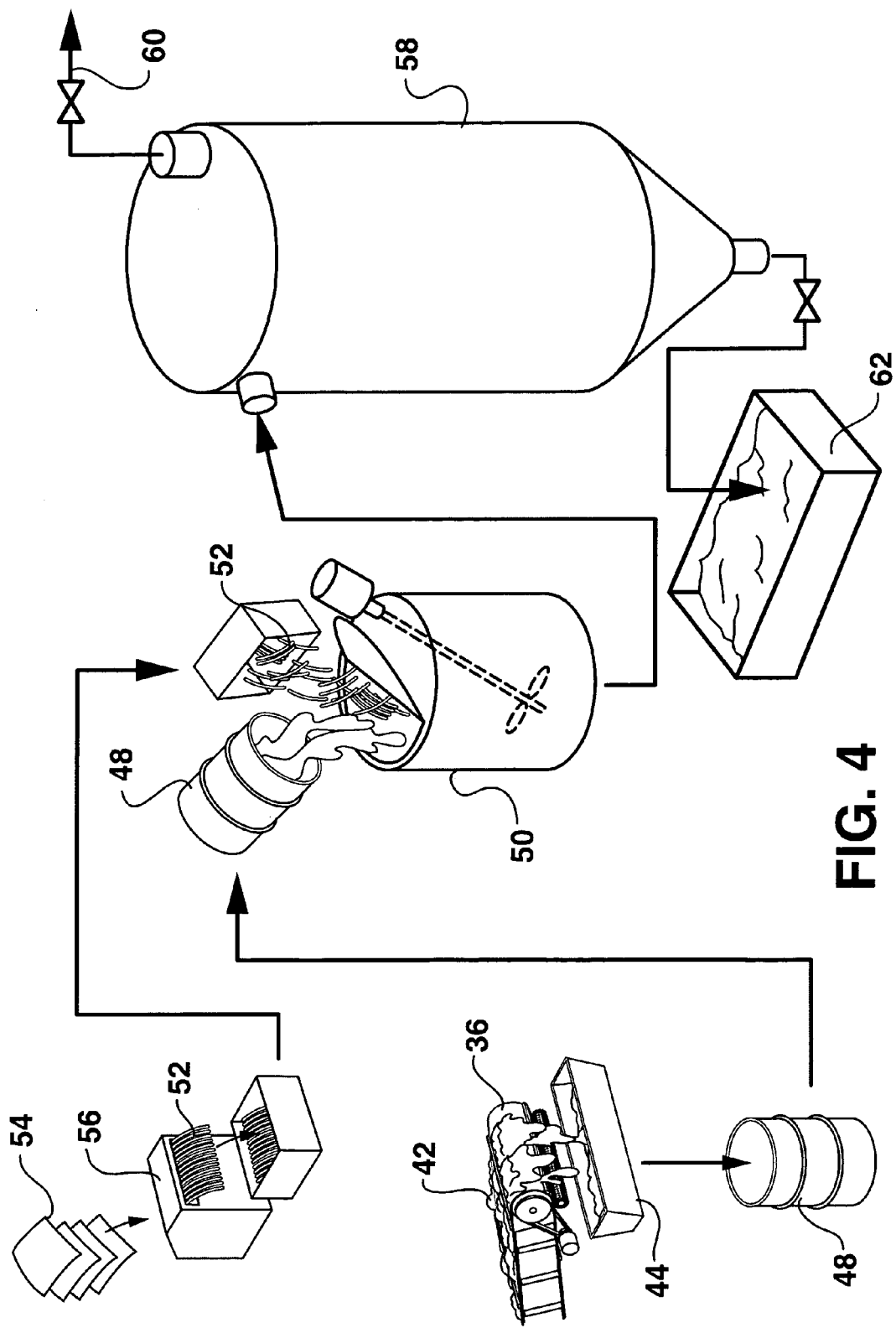
FIG. 4 is a diagram of one embodiment of an algal biomass recovery system in accordance with the present invention.

For example, referring to FIG. 4, one embodiment of a process and system for converting biomass into a hydrocarbon fuel is illustrated. As shown, algal biomass 42 is transferred from biomass collector 44 to another suitable container such as a barrel 48 and placed in a mixer 50 with a cellulose source 52. Various cellulose sources may be used; in the depicted embodiment, the cellulose source is shredded waste paper. For example, as shown, a waste paper 54, such as newspaper, is fed to a shredder 56 and shredded. The shredded paper 52 is then fed to the mixer 50. In one particular embodiment, the paper may be combined with the biomass in an amount from about 20% to about 80% by weight, such as from about 40% to about 60% by weight.

The cellulose/biomass mixture is then placed in a digester 58 where it ferments to produce a hydrocarbon gas 60, such as methane, and a nitrogen-rich residue 62. The digester mixture may be heated to a temperature of at least about 30° C., such as from about 30° to 40° C. in a water bath, for instance, to aid in the conversion process. A cellulose substrate creates a high carbon/nitrogen ratio, which increases gas yield by reducing the high concentration of ammonia in the digester. Although unknown, it is believed that the presence of the paper causes the production of cellulose enzymes which then facilitate the breakdown of the biomass.

The size of the digester 58 may vary depending upon the particular application. For example, in one embodiment, the digester can have a size of 5,000 gallons per acre that is taken up by the partitioned aquaculture system.

The nitrogen-rich residue 62 that is removed from the digester 58 contains concentrated amounts of nitrogen and phosphorus. For instance, the nitrogen present in the residue may be greater than 70%, such as greater than 95% in the form of ammonia. At least 30% of the phosphorus contained in the residue, particularly at least 50% of the phosphorus contained in the residue may be contained in a soluble compound. Thus, the residue 62 represents a valuable fertilizer that may be packaged and used in agricultural applications.

The present invention may be better understood with reference to the following examples.

EXAMPLE NO. 1

The following example is provided for demonstrating the digestability and methane yield of algal biomass obtained from aquatic organisms.

The experiments were carried out in four-liter plexiglass digesters loaded with *Spirulina*. The digesters were maintained at 35±2° C. in a water bath. PH was maintained in the 6.5 to 7.2 range by feeding 5N NaOH solution as needed. All data was collected after operating the digester at 5 hydraulic detention times to assure steady state performance of the digester.

The cyanobacteria *Spirulina* used in the control studies was obtained as a dry powder. The algae biomass was harvested using $FeCl_3$ and $FeSO_4$ as the flocculation agent.

Total solids, volatile solids and total organic acid analyses were performed in accordance using Standard Methods. The methane content of gas was measured by gas chromatography with TCD with a column temperature at 45° C., using argon as the carrier gas. Total organic carbon, inorganic carbon and total carbon were measured with total organic carbon analyzer (Rosemount, DC 190). Ammonia concentration in influent and effluent was measured with ammonia electrode (Orion model 720A).

The results are shown in FIGS. 5 and 6.

This example demonstrates that co-digestion of algal biomass with paper at a combined loading rate of 4 g VS/l day at a ten day HRT increased methane yields by over 200%. The increased biogas yield is likely due to the balanced C/N ratio of the substrate and increased cellulase production rate as a result of the addition of paper to the feedstock. It is believed that an optimum C/N ratio for co-digestion of algal biomass and paper is in the range of about 18/1 to about 25/1.

Although exemplary embodiments have been described using specific terms and devices, such description is for illustrative purposes only and as such, the words used are words of description rather than of limitation. The specification notes that substitutions, modifications, and combinations of components and the various embodiments can be made without departing from the spirit and scope of what is set forth in the claims that follow below.

What is claimed is:

1. A controlled eutrophication process comprising:
   flowing a wastewater containing a waste component comprising nitrogen, phosphorus or mixtures thereof into an algal growth channel;
   contacting the wastewater with a species of algae in the algal growth channel, the algae consuming and depleting the waste component from the wastewater;
   flowing a first portion of the algal laden water from the algal growth channel to a raceway, the raceway containing a first aquatic organism, the first aquatic organism consuming the algae in the water and excreting an algal biomass;

flowing a second portion of algal laden water from the algal growth channel to a polishing chamber, the polishing chamber containing a second aquatic organism, the second aquatic organism consuming at least about 60% of the algae contained in the water, the second aquatic organism excreting an algal biomass;

discharging water from the polishing chamber to an external water source; and collecting the algal biomass from the raceway and the polishing chamber.

2. A process as defined in claim 1, further comprising the step of controlling a first flowrate through the algal growth channel and a second flowrate through the raceway.

3. A process as defined in claim 2, wherein the flowrate of the algal growth channel is from about 0.1 feet per second to about 0.3 feet per second.

4. A process as defined in claim 1, wherein the first portion of the algal laden water from the algal growth channel is fed to a plurality of raceways, each of the raceways containing an aquatic organism.

5. A process as defined in claim 1, wherein water flows from the algal growth channel to a common channel and from the common channel to the raceway or the polishing chamber.

6. A process as defined in claim 1, wherein the first aquatic organism and the second aquatic organism comprise fish.

7. A process as defined in claim 6, wherein the first aquatic organism and the second aquatic organism comprise a tilapia.

8. A process as defined in claim 6, wherein at least one of the first aquatic organism or the second aquatic organism comprises a filter feeding fish.

9. A process as defined in claim 1, wherein the second aquatic organism consumes at least about 90% of the algae contained in the water fed to the polishing chamber.

10. A process as defined in claim 1, wherein the water discharged to the external water source from the polishing chamber contains less than about 5 mg/liters of organic matter and less than 0.05 mg/liters of phosphorus.

11. A process as defined in claim 1, further comprising a step of periodically harvesting the first and second aquatic organisms.

12. A process as defined in claim 1, wherein over a 24-hour period, the wastewater flowing into the algal growth channel is approximately equal to the water being discharged by the polishing chamber.

13. A process as defined in claim 1, wherein the polishing chamber comprises a first containment section and a second containment section, each of the containment sections containing the second aquatic species, and wherein water is alternately discharged from the first containment section and the second containment section such that the polishing chamber operates as a sequencing batch reactor.

14. A process as defined in claim 1, further comprising the step of placing the collected algal biomass into a digester and producing a hydrocarbon gas.

15. A process as defined in claim 14, wherein the hydrocarbon gas comprises methane.

16. A process as defined in claim 14, wherein the algal biomass is combined with a cellulose source in the digester.

17. A process as defined in claim 16, wherein the cellulose source comprises paper.

18. A process as defined in claim 16, wherein the cellulose source is combined with the algal biomass in an amount of from about 20% to about 60% by weight of a mixture of the algal biomass and the cellulose source.

19. A process as defined in claim 14, further comprising the step of collecting a fertilizer composition from the digester.

20. A process as defined in claim 19, wherein the fertilizer composition comprises at least about 80% ammonia and at least about 30% soluble phosphorus compounds.

21. A process as defined in claim 14, wherein fermentation takes place within the digester.

22. A process as defined in claim 14, wherein the digester is heated to a temperature of from about 30° C. to about 40° C.

23. A process as defined in claim 1, wherein the algal biomass is continuously removed from the raceway and the polishing chamber.

24. A process as defined in claim 23, wherein the algal biomass is removed by a porous conveyor.

25. A process as defined in claim 1, wherein the first aquatic organism and the second aquatic organism are the same but are present in different densities and different average sizes between the raceway and the polishing chamber.

26. A controlled eutrophication process comprising:

flowing a wastewater containing a waste component comprising nitrogen, phosphorus or mixtures thereof into an algal growth channel;

contacting the wastewater with a species of algae in the algal growth channel, the algae consuming and depleting the waste component from the wastewater;

flowing a portion of the algal laden water from the algal growth channel to a polishing chamber, the polishing chamber comprising a first containment section and a second containment section, each of the containment sections containing a first aquatic organism, the first aquatic organism consuming the algae contained in the water such that the algae levels in the water are reduced to below about 5 mg per liter;

discharging the water at the reduced algae levels to a water source; and wherein water is alternately discharged from the first containment section and the second containment section such that the polishing chamber operates as a sequencing batch reactor.

27. A process as defined in claim 26, further comprising the step of flowing a second portion of algal laden water from the algal growth channel to a raceway, the raceway containing a second aquatic organism, the second aquatic organism consuming the algae in the water and excreting an algal biomass.

28. A process as defined in claim 27, further comprising the step of controlling a first flowrate through the algal growth channel and a second flowrate through the raceway.

29. A process as defined in claim 27, wherein water flows from the algal growth channel to a common channel and from the common channel to the raceway or the polishing chamber.

30. A process as defined in claim 27, wherein the algal biomass is continuously removed from the raceway and the polishing chamber.

31. A process as defined in claim 30, wherein the algal biomass is removed by a porous conveyor.

32. A process as defined in claim 26, wherein the first aquatic organism comprises a fish.

33. A process as defined in claim 32, wherein the fish comprises a tilapia.

34. A process as defined in claim 32, wherein the fish comprises a filter feeding fish.

35. A process as defined in claim 26, wherein the first aquatic organism consumes at least about 90% of the algae contained in the water that is fed to the polishing chamber.

36. A process as defined in claim 26, wherein the water discharged to the external water source from the polishing chamber contains less than about 5 mg/liters of organic matter and less than 0.05 mg/liters of phosphorus.

37. A process as defined in claim 26, wherein the first aquatic organism excretes an algal biomass and the process further comprises steps of collecting the algal biomass.

38. A process as defined in claim 37, further comprising the step of placing the collected algal biomass into a digester and producing a hydrocarbon gas.

39. A process as defined in claim 38, wherein the algal biomass is combined with a cellulose source in the digester.

40. A process as defined in claim 39, wherein the cellulose source comprises paper.

41. A process as defined in claim 40, wherein the cellulose source is combined with the algal biomass in an amount of from about 20% to about 60% by weight of a mixture of the algal biomass and the cellulose source.

42. A process as defined in claim 38, further comprising the step of collecting a fertilizer composition from the digester.

43. A process as defined in claim 38, wherein the digester is heated to a temperature of from about 30° C. to about 40° C.

44. A controlled eutrophication process comprising:
flowing a wastewater containing a waste component comprising nitrogen, phosphorus or mixtures thereof into an algal growth channel;
contacting the wastewater with a species of algae in the algal growth channel, the algae consuming and depleting the waste component from the wastewater;
flowing at least a portion of the algal laden water from the algal growth channel to a containment area, the containment area containing at least a first aquatic organism, the first aquatic organism consuming the algae in the water and excreting an algal biomass;
discharging water from the containment area to an external water source; and
continuously collecting algal biomass excreted by the first aquatic organism, the biomass being collected by a porous conveyor located below the first aquatic organism.

45. A process for producing a hydrocarbon from a biomass comprising:
flowing a wastewater containing a waste component comprising nitrogen, phosphorus or mixtures thereof into an algal growth channel;
contacting the wastewater with a species of algae in the algal growth channel, the algae consuming and depleting the waste component from the wastewater;
flowing at least a portion of the algal laden water from the algal growth channel to a containment area, the containment area containing at least a first aquatic organism, the first aquatic organism consuming the algae in the water and excreting an algal biomass;
mixing said algal biomass with a cellulose source in a digester, the cellulose source being present in an amount from about 20% to about 60% by weight of a mixture of the biomass and cellulose source;
heating the mixture to at least 30° C.; and
collecting a hydrocarbon gas from the digester.

46. A process as defined in claim 45, wherein the hydrocarbon gas comprises methane.

47. A process as defined in claim 45, wherein the cellulose source comprises paper.

48. A process as defined in claim 45, wherein the mixture is heated to a temperature of from about 30° C. to about 40° C.

49. A process as defined in claim 45, further comprising a step of collecting a fertilizer composition from the digester in addition to the hydrocarbon gas.

50. A controlled eutrophication system comprising:
an inlet in fluid communication with an algal growth channel;
a first flowrate control device for controlling the flowrate of water through the algal growth channel;
an aquatic organism containment area in fluid communication with the algal growth channel for holding an aquatic organism and receiving an algal laden water from the algal growth channel, the aquatic organism consuming algae and excreting an algal biomass;
a porous conveyor located in the aquatic organism containment area for continuously removing the algal biomass; and
a discharge in fluid communication with the aquatic organism containment area for discharging water having reduced levels of algae.

51. A controlled eutrophication system comprising:
an inlet in fluid communication with an algal growth channel;
a first flowrate control device for controlling the flowrate of water through the algal growth channel;
at least one raceway in fluid communication with the algal growth channel, the raceway containing a first aquatic organism that consumes algae and excretes an algal biomass;
a second flowrate control device for controlling the flowrate of water through the raceway;
a polishing chamber in fluid communication with the algal growth channel, the polishing chamber containing a second aquatic organism that consumes algae and excretes an algal biomass;
a biomass removal device for removing algal biomass from the raceway and the polishing chamber; and
a discharge in fluid communication with the polishing chamber for discharging water to an external water source having reduced levels of algae.

52. A system as defined in claim 51, wherein the first flowrate control device comprises a paddle wheel.

53. A system as defined in claim 51, wherein the first flowrate control device and the second flowrate control device are operated by a common controller.

54. A system as defined in claim 53, wherein the controller comprises a microprocessor.

55. A system as defined in claim 51, wherein the system includes a plurality of raceways, each of the raceways containing an aquatic organism.

56. A system as defined in claim 51, further comprising a common channel in communication with the algal growth channel, the raceway, and the polishing chamber, wherein water from the algal growth channel flows into the common channel and then into either the raceway or the polishing chamber.

57. A system as defined in claim 51, wherein the polishing chamber comprises a first containment section and a second containment section, each of the containment sections containing an aquatic organism, and wherein water is alternately discharged from the first containment section and the second containment section such that the polishing chamber operates as a sequencing batch reactor.

58. A system as defined in claim 51, further comprising a digester configured to receive the algal biomass after the biomass is removed from the raceway and the polishing chamber from the biomass removal device.

59. A system as defined in claim 58, wherein the digester is configured to be heated to a temperature of at least 30° C.

60. A system as defined in claim 51, wherein the biomass removal device comprises a porous conveyor positioned at least in the raceway.

61. A system as defined in claim 60, wherein the porous conveyor continuously removes biomass from the raceway.

* * * * *